US008805656B2

(12) United States Patent
Hashima et al.

(10) Patent No.: US 8,805,656 B2
(45) Date of Patent: Aug. 12, 2014

(54) THREE-DIMENSIONAL SIMULATION METHOD AND APPARATUS

(75) Inventors: Masayoshi Hashima, Kawasaki (JP); Hideki Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 417 days.

(21) Appl. No.: 13/209,783

(22) Filed: Aug. 15, 2011

(65) Prior Publication Data
US 2012/0059629 A1 Mar. 8, 2012

(30) Foreign Application Priority Data

Sep. 2, 2010 (JP) ................................. 2010-196912

(51) Int. Cl.
*G06F 17/50* (2006.01)
(52) U.S. Cl.
USPC ....................................... 703/2; 703/5; 703/7
(58) Field of Classification Search
USPC .................................................... 703/2, 5, 7
See application file for complete search history.

(56) References Cited

FOREIGN PATENT DOCUMENTS

| JP | 2002-231074 | 8/2002 |
|---|---|---|
| JP | 2002-275721 | 9/2002 |
| JP | 2006-235714 | 9/2006 |
| JP | 2008-234039 | 10/2008 |
| JP | 2010-009143 | 1/2010 |

OTHER PUBLICATIONS

Japanese Office Action dated Dec. 24, 2013in Japanese Patent Application No. 2010-196912.

*Primary Examiner* — Thai Phan
(74) *Attorney, Agent, or Firm* — Staas & Halsey LLP

(57) ABSTRACT

A three-dimensional simulation apparatus includes a memory configured to store form information of a sheet flexible object model formed of first polygons and another object model, an interference determination unit configured to determine whether the sheet flexible object model formed of the first polygons in three-dimensional simulation space interferes with the other object model on the basis of the form information stored in the storage unit, a polygon creation unit configured to form second polygons by dividing the sheet flexible object model in a longitudinal direction when it is determined that the sheet flexible object model interferes with the other object model, and a shape computation unit configured to determine a shape of the sheet flexible object model using the formed second polygons in consideration of a shape of the other object model.

8 Claims, 29 Drawing Sheets

FIG. 7

| VERTEX ID | COORDINATES |
|---|---|
| P001 | (x1,y1,z1) |
| P002 | (x2,y2,z2) |
| P003 | (x3,y3,z3) |
| P004 | (x4,y4,z4) |
| P005 | (x5,y5,z5) |
| ⋮ | ⋮ |

| SIMPLE POLYGON ID | LOCAL COORDINATE SYSTEM | VERTEX OF DETAIL POLYGON INCLUDED IN SIMPLE POLYGON | POSITION OF DETAIL POLYGON IN LOCAL COORDINATE SYSTEM |
|---|---|---|---|
| T001 | C001 | P001<br>P002<br>P003<br>... | $(xq001, yq001, zq001)$<br>$(xq002, yq002, zq002)$<br>$(xq003, yq003, zq003)$<br>... |
| T002 | C002 | P011<br>P012<br>... | $(xq011, yq011, zq011)$<br>$(xq012, yq012, zq012)$<br>... |
| T003 | C003 | P021<br>P022<br>... | $(xq021, yq021, zq021)$<br>$(xq022, yq022, zq022)$<br>... |
| T004 | C004 | P031<br>P032<br>... | $(xq031, yq031, zq031)$<br>$(xq032, yq032, zq032)$<br>... |
| T005 | C005 | P041<br>P042<br>... | $(xq041, yq041, zq041)$<br>$(xq042, yq042, zq042)$<br>... |
| .. | .. | .. | .. |

260

THREE-DIMENSIONAL SIMULATION METHOD AND APPARATUS

CROSS-REFERENCE TO RELATED APPLICATION

This application is based upon and claims the benefit of priority of the prior Japanese Patent Application No. 2010-196912, filed on Sep. 2, 2010 the entire contents of which are incorporated herein by reference.

FIELD

The embodiments discussed herein are related to a three-dimensional simulation method and apparatus.

BACKGROUND

A three-dimensional model simulation is a technique for setting virtual three-dimensional simulation space in a computer, setting the shape of a three-dimensional object model in the three-dimensional simulation space, and simulating an actual physical phenomenon of the three-dimensional object model by computation. In the response of a three-dimensional model simulation, a technique such as three-dimensional CAD, structure analysis simulation, computer graphics, or virtual reality is used.

In a three-dimensional model simulation, a deformable sheet object model with flexibility (hereinafter referred to as a sheet flexible object) such as a piece of paper, a film, a flexible printed circuit board, a flat cable, or a piece of electronic paper is sometimes used. For example, when a simulation target apparatus model (hereinafter referred to as a target apparatus) set in three-dimensional simulation space is designed, the target apparatus may include a flexible printed circuit board that is one of sheet flexible objects. For example, when a target apparatus is a flip phone, a flexible printed circuit board may be disposed at a hinge portion of the flip phone. When the flip phone is folded, the flexible printed circuit board becomes deformed in accordance with the folding operation. In a three-dimensional model simulation, when the flip phone is folded, it is possible to determine whether the shape and position of the flexible printed circuit board at the hinge portion of the flip phone are acceptable or to check the interference of the flexible printed circuit board with another object in the flip phone by computation.

Examples of a technique for simulating the shape of a deformable sheet flexible object include a mass-spring method of mesh-dividing a sheet flexible object into triangle or square polygon elements, setting mass points at vertices of the polygon elements, and connecting the mass points with, for example, spring elements. The shape of the sheet flexible object is specified by calculating a position where the mass points and the spring elements are dynamically stable.

When a sheet flexible object interferes with another object in a target apparatus, the sheet flexible object is deformed along the surface of the object. This deformation is hereinafter referred to as a "profiling deformation". When the simulation of a profiling deformation is performed using a mass-spring method, a sheet flexible object is deformed along the surface of another object so as not to be pushed into the object. At that time, the sheet flexible object is moved so that there is no mass point of the sheet flexible object in another object. It is generally desirable to obtain an accurate computation result in a three-dimensional model simulation. Accordingly, in order to allow a sheet flexible object to freely deform, the mass-spring model of the sheet flexible object is finely divided into polygon elements.

However, the amount of computation performed when a sheet flexible object interfering with another object is deformed is proportional to the number of mass points. When a sheet flexible object locally interferes with another object, for example, only a part of the sheet flexible object curves outward. That is, the local deformation of the sheet flexible object easily occurs. Such a local deformation is unnatural, because it can be assumed that a flexible object such as a flexible printed circuit board cannot be stretched. Thus, in the related art disclosed in, for example, Japanese Laid-open Patent Publication Nos. 2002-275721, 2008-234039, and 2002-231074, the number of checks for interference between a sheet flexible object and another object is increased, and an unnatural deformation occurs at a point of interference between the sheet flexible object and another object.

SUMMARY

According to an aspect of the invention, a three-dimensional simulation apparatus includes a memory configured to store form information of a sheet flexible object model formed of first polygons and another object model, an interference determination unit configured to determine whether the sheet flexible object model formed of the first polygons in three-dimensional simulation space interferes with the other object model on the basis of the form information stored in the storage unit, a polygon creation unit configured to form second polygons by dividing the sheet flexible object model in a longitudinal direction when it is determined that the sheet flexible object model interferes with the other object model, and a shape computation unit configured to determine a shape of the sheet flexible object model using the formed second polygons in consideration of a shape of the other object model.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating a data table for detail mesh models in the flexible printed circuit board.

FIG. 26 is a diagram illustrating a data table for simple meshes in the flexible printed circuit board.

DESCRIPTION OF EMBODIMENTS

Embodiments of the present invention will be described below with reference to the accompanying drawings.

[1] Three-Dimensional Simulation Apparatus According to Embodiment

Figure 1:
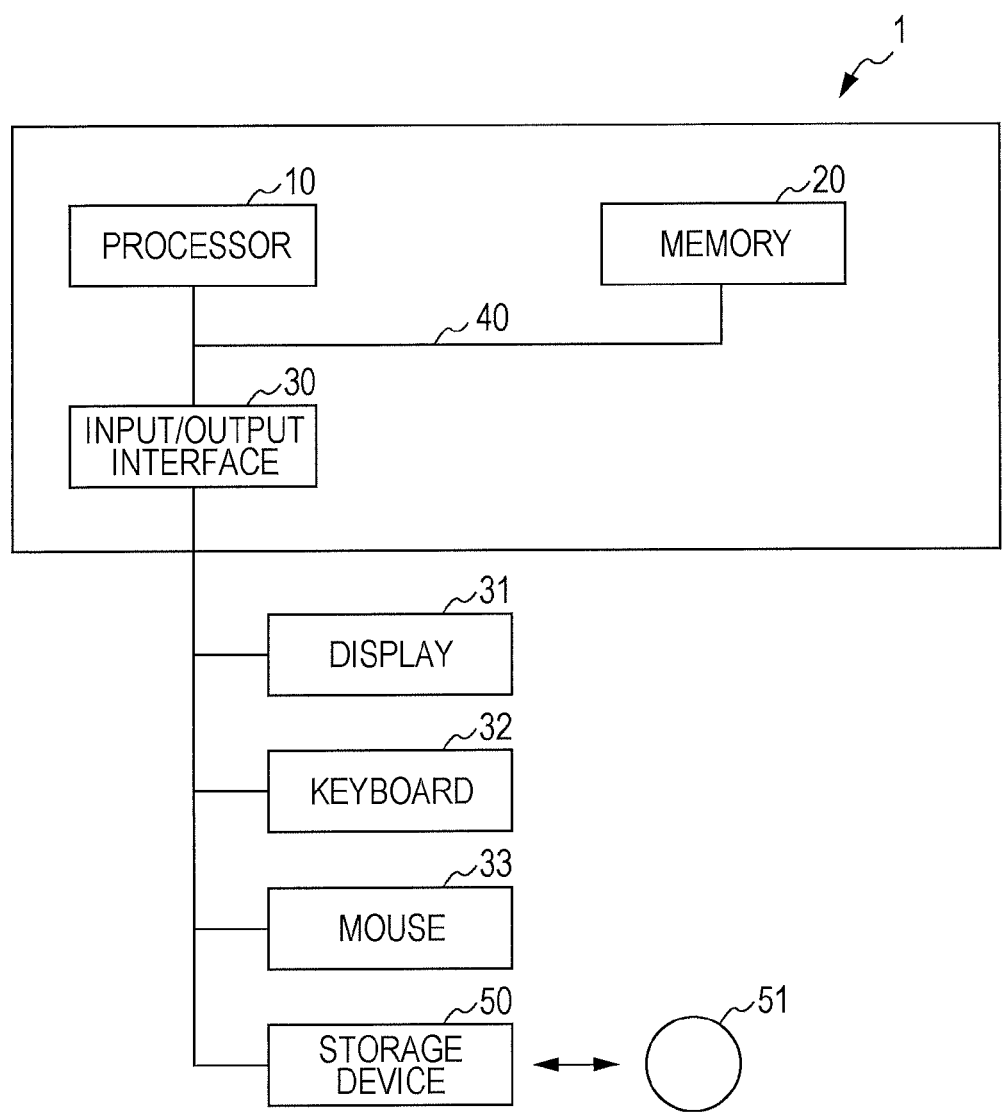
FIG. 1 is a diagram illustrating a hardware configuration of a computer system for achieving a three-dimensional simulation apparatus according to an embodiment of the present invention.
Figure 2:
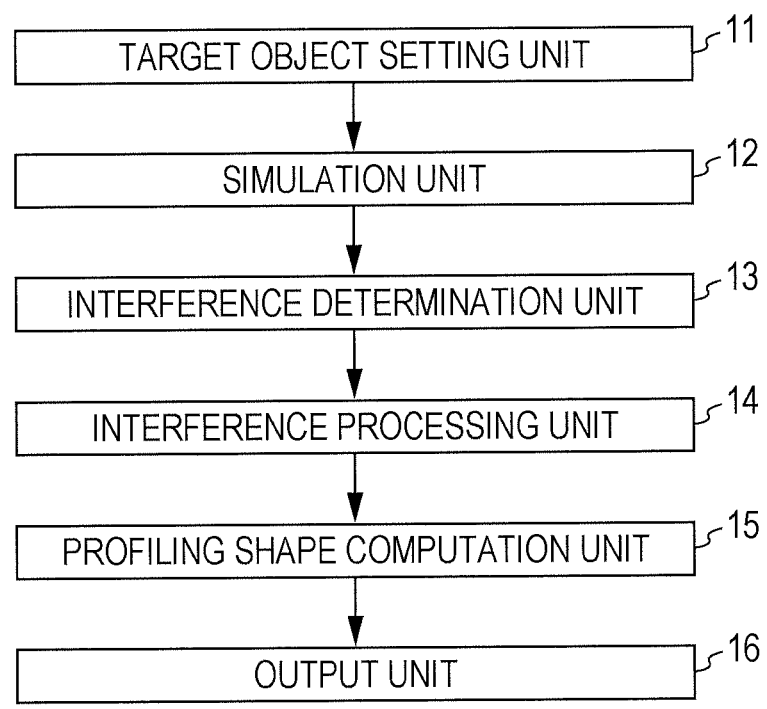
FIG. 2 is a functional block diagram of the three-dimensional simulation apparatus illustrated in FIG. 1.

FIG. 1 is a diagram illustrating a hardware configuration of a computer system for achieving a three-dimensional simulation apparatus 1 according to an embodiment of the present invention. FIG. 2 is a functional block diagram of the three-dimensional simulation apparatus 1 illustrated in FIG. 1.

The three-dimensional simulation apparatus 1 (for example, a personal computer) according to an embodiment of the present invention illustrated in FIG. 1 forms a virtual three-dimensional shape by computation and simulates an actual physical phenomenon that occurs at the formed three-dimensional shape by computation. In particular, the three-dimensional simulation apparatus 1 simulates the layout design of a sheet flexible object such as a piece of paper, a film, a flexible printed circuit board, a flat cable, or a piece of electronic paper included in a design target apparatus. In the following, a description will be made under the assumption that a sheet flexible object is a flexible printed circuit board and a design target apparatus including a flexible printed circuit board is a printer or a mobile telephone.

Flexible printed circuit boards are obtained by forming an adhesive layer on a film insulator and forming a conductive foil on the adhesive layer, and are covered by the insulator for protection except for a terminal portion and a solder connection portion. The thickness of such a flexible printed circuit board is smaller than that of a rigid substrate, and easily deforms. Accordingly, a flexible printed circuit board is used as a wiring line in a moving portion or a three-dimensional wiring line. For example, a flexible printed circuit board is used as a wiring line for transmitting an electric signal to a printer head, a wiring line passing through a hinge in a flip phone, or a wiring line in a camera lens. For example, the positioning and fixing of a flexible printed circuit board is performed by connecting both ends of the flexible printed circuit board to connectors of a design target apparatus.

As illustrated in FIG. 1, the three-dimensional simulation apparatus 1 includes a processor (CPU) 10, a memory (including a ROM, a RAM, etc.) 20, and an input/output interface 30 that are connected to one another via a bus 40. The input/output interface 30 is connected to a display (for example, a CRT, an LCD, or a PDP) 31, a keyboard 32, a mouse 33, and a storage device 50.

The memory 20 stores a three-dimensional simulation program and various pieces of data of a simulation target apparatus model (hereinafter referred to as a target apparatus), and functions as a working memory at the time of execution of the three-dimensional simulation program by the processor (CPU) 10.

The storage device 50 reads out a three-dimensional simulation program stored in a computer-readable recording medium 51. The computer-readable recording medium 51 is, for example, a flexible disk, a CD-ROM, a DVD, a magnetic disk, an optical disc, a magneto-optical disk, an IC card, a ROM cartridge, a magnetic tape, a punched card, or a printed material on which a code such as a bar code is printed. The storage device 50 can store pieces of data of various electronic components for a design target apparatus in a library in advance. For example, the three-dimensional simulation apparatus 1 reads the three-dimensional simulation program, which has been read out from the computer-readable recording medium 51 by the storage device 50, into the memory 20 via the input/output interface 30.

In the three-dimensional simulation apparatus 1, the processor (CPU) 10 executes the three-dimensional simulation program stored in the memory 20. As illustrated in FIG. 2, in this embodiment, the processor 10 executes the three-dimensional simulation program, thereby functioning as a target object setting unit 11, a simulation unit 12, an interference determination unit 13, an interference processing unit 14, a profiling shape computation unit 15, and an output unit 16.

[2] Flexible Object Deformation Calculation According to Embodiment

Next, the target object setting unit 11, the simulation unit 12, the interference determination unit 13, the interference processing unit 14, the profiling shape computation unit 15, and the output unit 16, which are achieved by the processor 10, will be described in detail. In the following, a description will be made under the assumption that a sheet flexible object model is a flexible printed circuit board.

Figure 3:
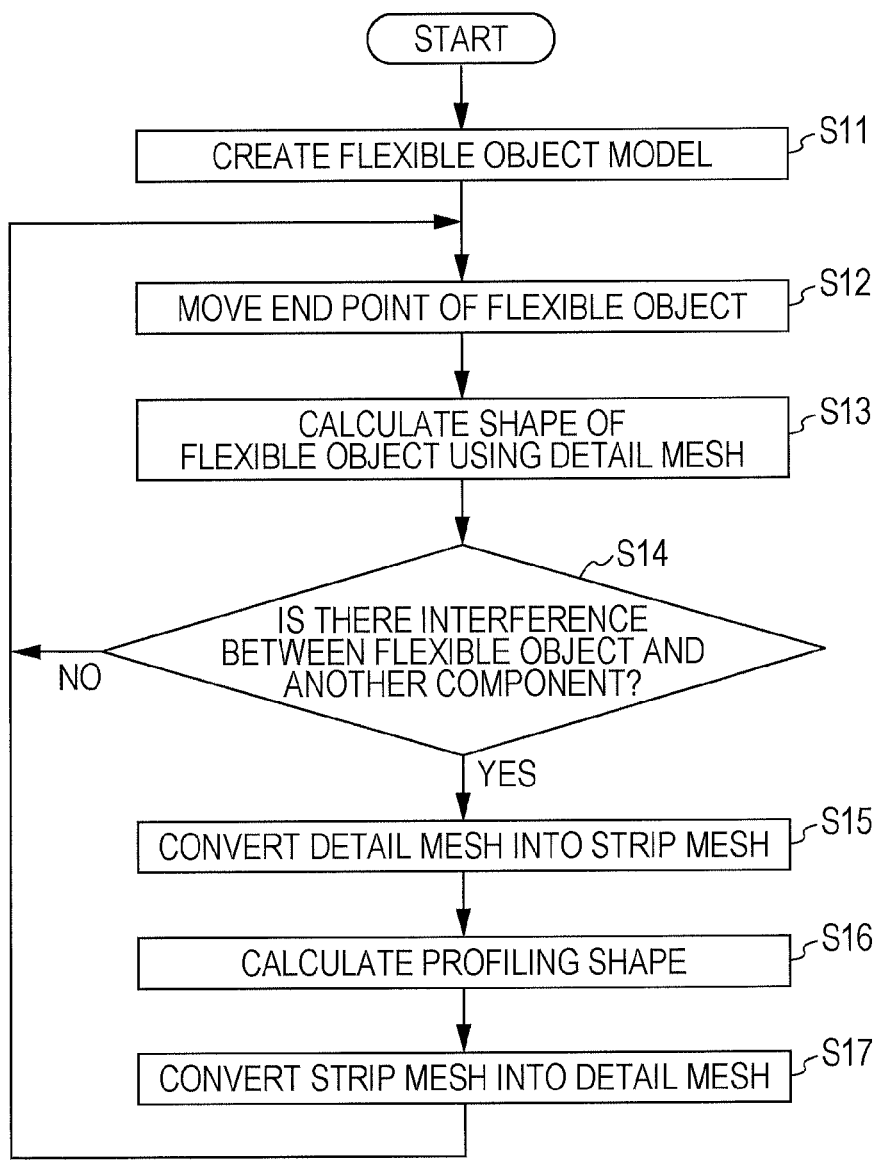
FIG. 3 is a flowchart illustrating a calculation process for the deformation of a sheet flexible object.

FIG. 3 is a flowchart illustrating a calculation process for the deformation of a sheet flexible object. In the following, the detailed description of the flowchart illustrated in FIG. 3 will be made.

[2-1] Flexible Object Model Creation

On the basis of three-dimensional model data (hereinafter referred to as a flexible printed circuit board) of a flexible printed circuit board and three-dimensional model data (hereinafter referred to as another object) of a mechanical component stored in the memory 20 or a mechanical component library in the storage device 50, the target object setting unit 11 creates three-dimensional models of the flexible printed circuit board and the object.

The target object setting unit 11 sets three-dimensional flexible object model data used for the simulation of the flexible printed circuit board (S11). For example, the three-dimensional model data includes pieces of information about sizes in the longitudinal, width, and thickness directions, a mass, and rigidity of the flexible printed circuit board. The target object setting unit 11 stores in the memory 20 various values that have been externally input with the keyboard 32 and the mouse 33 and are used for the simulation of the flexible printed circuit board in three-dimensional space.

Figure 4:
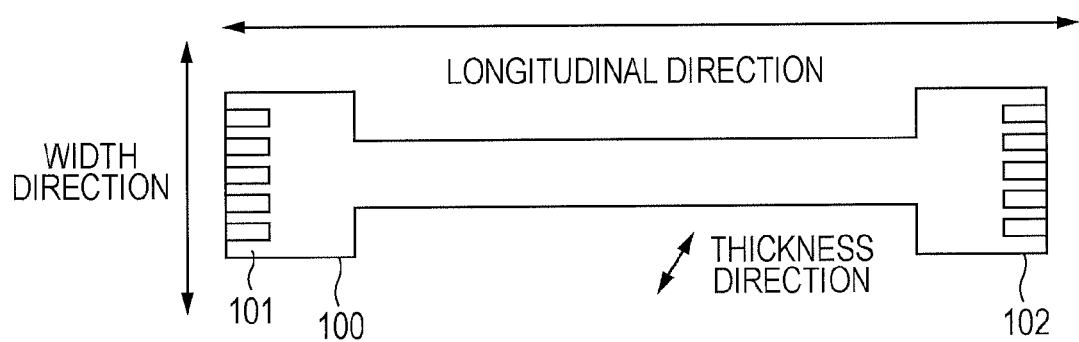
FIG. 4 is a diagram illustrating an exemplary shape of a flexible printed circuit board that is a sheet flexible object.

FIG. 4 is a diagram illustrating an exemplary shape of a flexible printed circuit board that is a sheet flexible object. A flexible printed circuit board 100 includes at both ends thereof connection portions 101 and 102 for connection to connectors of an apparatus. Between the connection portions 101 and 102, an electric signal can be transmitted. In this embodiment, a direction along the connection portions 101 and 102 connected to connectors is defined as a width direction, a direction in which the connection portions 101 and 102 are arranged and the shape of the flexible printed circuit board 100 is changed is defined as a longitudinal direction, and a direction along the thickness of the flexible printed circuit board 100 is defined as a thickness direction.

Figure 5:
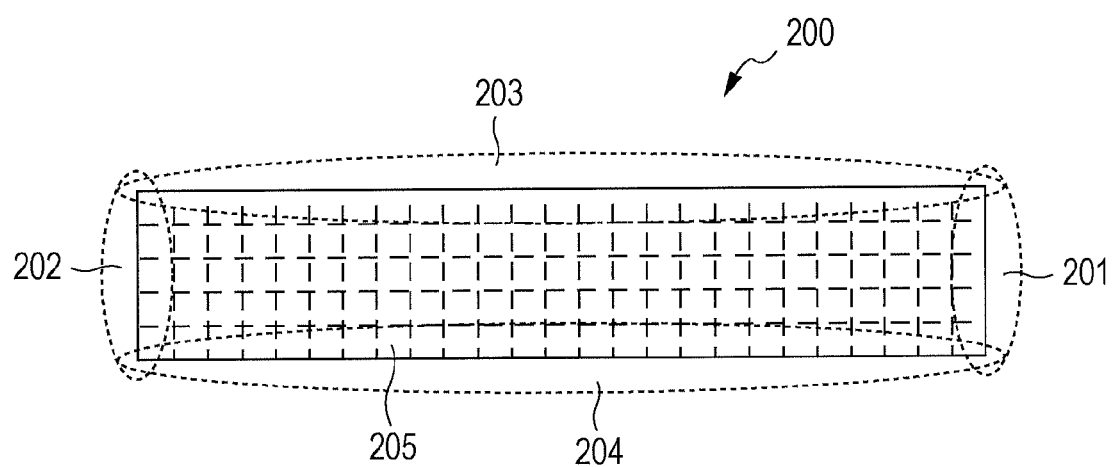
FIG. 5 is a diagram illustrating a rectangular flexible printed circuit board.

In this embodiment, for simplification of description, a rectangular flexible printed circuit board is used. FIG. 5 illustrates a rectangular flexible printed circuit board 200. In this embodiment, both ends of the flexible printed circuit board 200 in the longitudinal direction are end points 201 and 202, and both ends of the flexible printed circuit board 200 in the width direction are sides 203 and 204.

The target object setting unit 11 performs modeling of a flexible printed circuit board using, for example, a mass-spring modeling method used for cloth simulation or a shape calculation method. In the mass-spring method, the flexible printed circuit board 200 is processed as the set of polygons such as triangles or squares. The set of polygons is defined as a mesh. The target object setting unit 11 divides the surface of a flexible printed circuit board into a plurality of polygons. When the size of each polygon is too large, a deformed shape becomes unnatural. When the size of each polygon is too small, the amount of calculation is increased. A user can therefore change the size of each polygon. The target object setting unit 11 divides a certain two-dimensional shape into a plurality of polygons using, for example, the Voronoi tessellation method. In FIG. 5, each rectangular region surrounded by broken lines on the flexible printed circuit board 200 is a polygon 205.

In this embodiment, a mesh determined by the target object setting unit 11 is defined as a detail mesh (a first mesh). In order to more accurately compute the shape of a sheet flexible object model, the number of polygons in a detail mesh is larger than that in a simple mesh (a second mesh) to be described later. That is, the number of mass points specified in a detail mesh is larger than that specified in a simple mesh.

Figure 6:
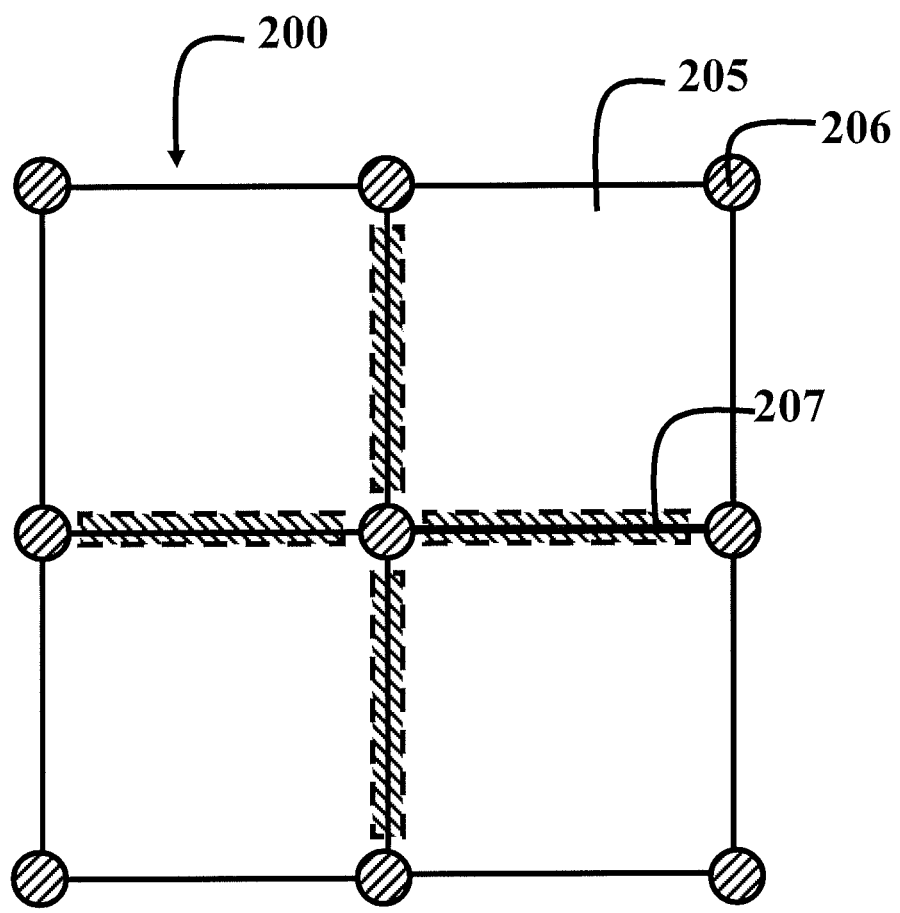
FIG. 6 is a partially enlarged view of the flexible printed circuit board illustrated in FIG. 5.

FIG. 6 is a partially enlarged view of the flexible printed circuit board 200 illustrated in FIG. 5. The polygons 205 are set for the flexible printed circuit board 200. A spring element 207 is set between the polygons 205. Each of the polygons 205 includes vertices 206, and has vertex information including vertex identification information identifying the vertex 206 and positional information of the vertex 206 in three-dimensional model space. The vertex information may include information about the relationship between each vertex and a corresponding polygon. The target object setting unit 11 divides the surface of the flexible printed circuit board 200 into the polygons 205, sets mass points at the vertices 206 of the polygons 205, sets return springs 207 at edges of the polygons 205, and sets a bending spring between adjacent ones of the polygons 205. The spring constant of a spring is set in accordance with the actual rigidity of the flexible printed circuit board 200.

FIG. 7 is a diagram illustrating a data table 250 for detail mesh models in the flexible printed circuit board 200. The data table 250 includes a vertex ID identifying a vertex and coordinates of the vertex in three-dimensional model space.

The target object setting unit 11 stores pieces of form information of the flexible printed circuit board and another object determined as above in the memory 20 and the storage device 50.

[2-2] Flexible Object Model Simulation

After the target object setting unit 11 has set a three-dimensional mechanical model, the simulation unit 12 simulates the deformation of a flexible printed circuit board synchronized with the movement of a mechanical component by computation using the three-dimensional mechanical model. In this embodiment, the model information of a connector connected to the flexible printed circuit board is stored in the memory 20 in advance.

Figure 8:
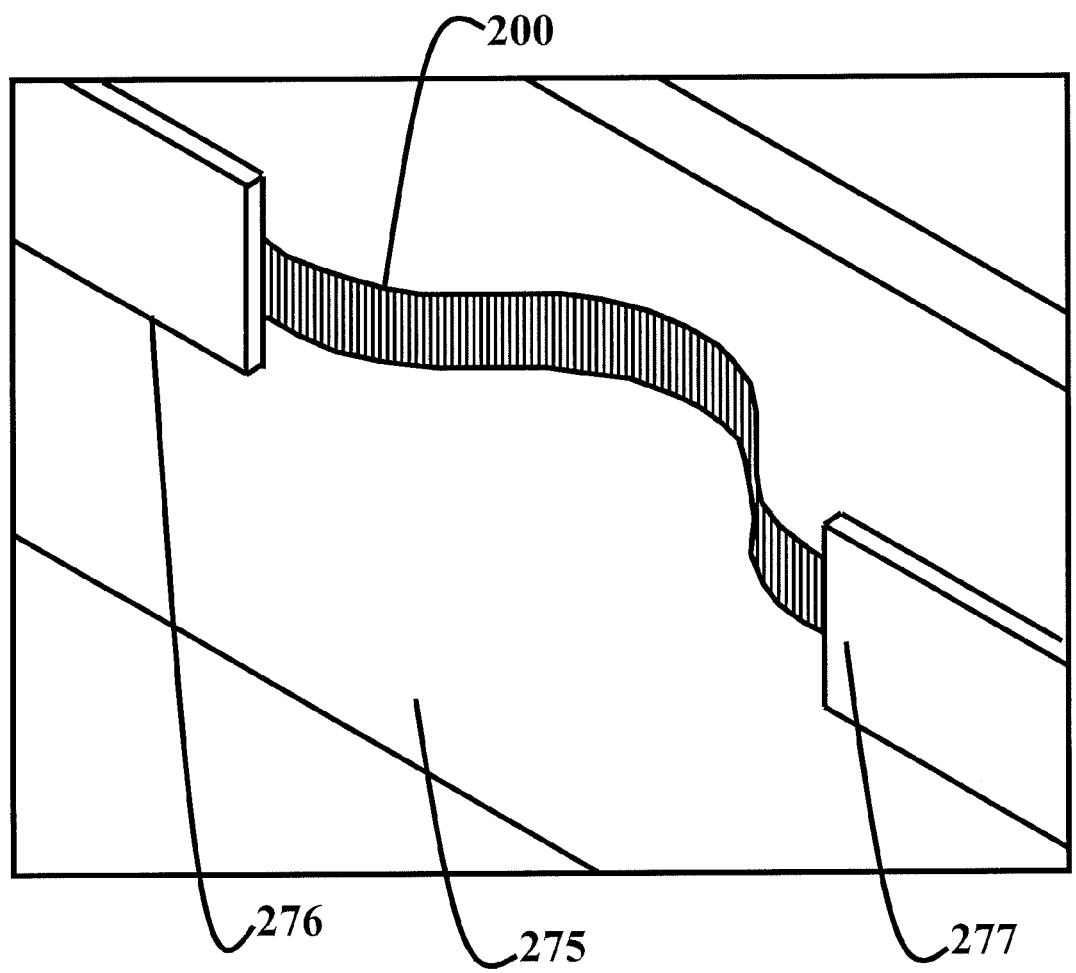
FIG. 8 is a diagram illustrating an example of shape deformation of a flexible printed circuit board at the time of deformation of a target apparatus.
Figure 9:
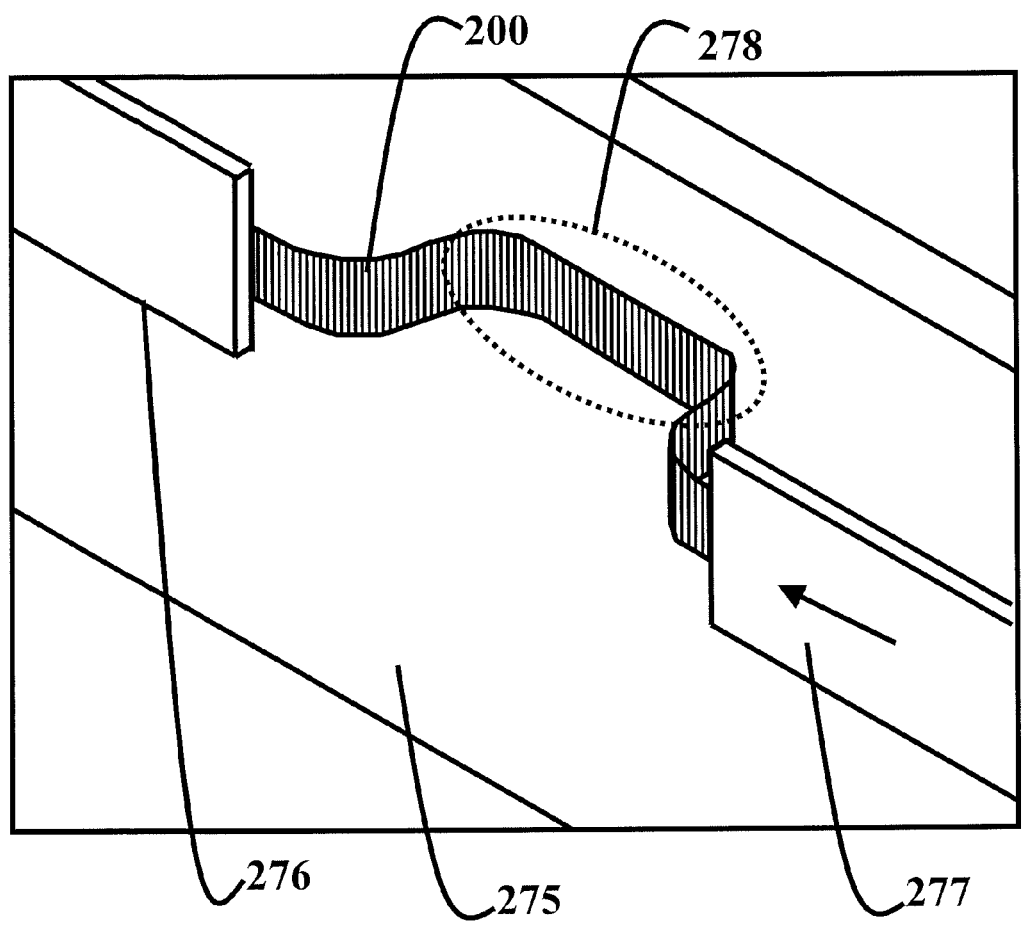
FIG. 9 is a diagram illustrating an example of shape deformation of a flexible printed circuit board at the time of deformation of a target apparatus.
Figure 10:
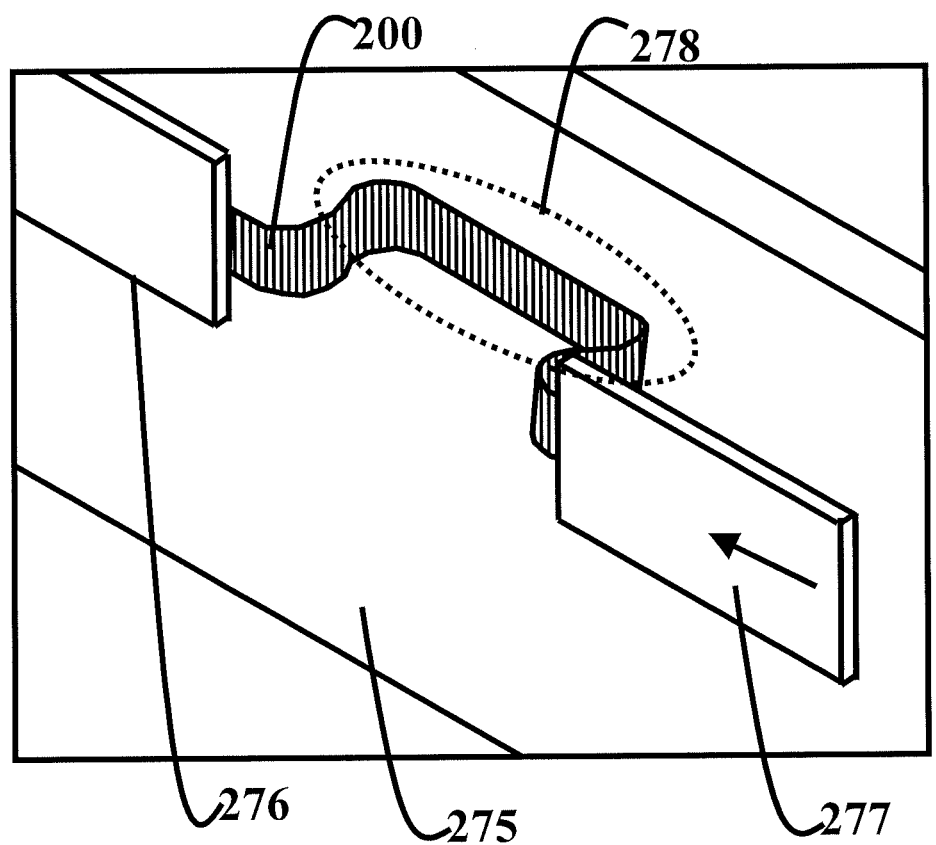
FIG. 10 is a diagram illustrating an example of shape deformation of a flexible printed circuit board at the time of deformation of a target apparatus.

In a simulation according to this embodiment, for example, the shape deformation of a flexible printed circuit board at the time of the operation of a target apparatus is specified by computation. FIGS. 8 to 10 illustrate examples of shape deformation of a flexible printed circuit board at the time of the operation of a target apparatus. Referring to FIG. 8, the flexible printed circuit board 200, another object 275 in a target apparatus, a connector 276 connected to one end point of the flexible printed circuit board 200, and a connector 277 connected to the other end point of the flexible printed circuit board 200 are illustrated. The target apparatus illustrated in FIGS. 8 to 10 deforms so that the connectors 276 and 277 are close to each other. FIG. 9 illustrates a state after the connector 277 has moved closer to the connector 276 from the position thereof illustrated in FIG. 8. In FIG. 9, a region 278 is illustrated where a part of the flexible printed circuit board 200 comes into contact with the object 275 and deforms along the surface of the object 275. FIG. 10 illustrates a state after the connector 277 has moved closer to the connector 276 from the position thereof illustrated in FIG. 8. Referring to FIG. 10, the region 278 and the amount of bending of the flexible printed circuit board 200 are larger than those in FIG. 9.

Figure 11:
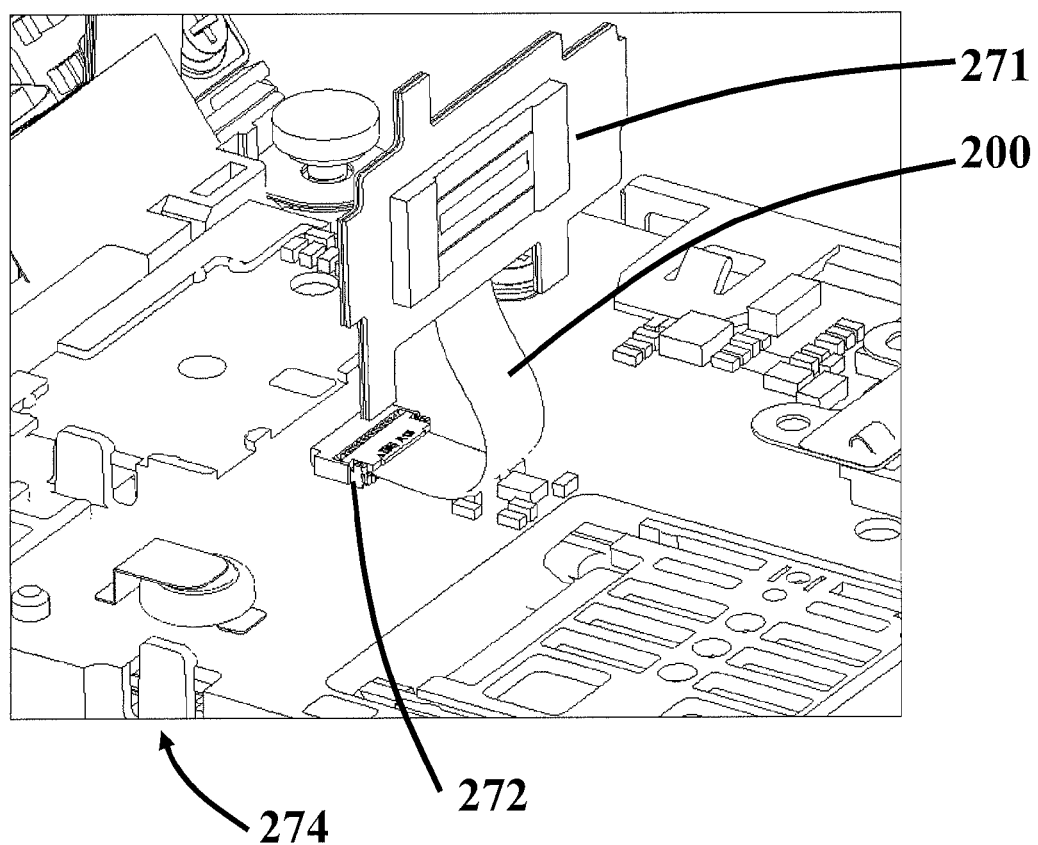
FIG. 11 is a diagram illustrating an exemplary simulation of a process of assembling a component into an apparatus.

Simulation processing according to this embodiment can also be performed to check an apparatus assembling process. In a simulation performed for checking an assembling process, an operation for assembling components connected to each other by a flexible printed circuit board into an apparatus is virtually performed and the deformation of the flexible printed circuit board during the operation is specified by computation. FIG. 11 illustrates an exemplary simulation of a process of assembling a component into an apparatus. Referring to FIG. 11, a connector 272 is disposed on a target apparatus 274, and one end point of the flexible printed circuit board 200 is connected to a component 271. A fabrication operator connects the other end point of the flexible printed circuit board 200 to the connector 272 at the time of fabrication of an apparatus. A three-dimensional simulation apparatus specifies the shape of the flexible printed circuit board 200 at the time of assembly by computation. On the basis of a result of the simulation, a designer can specify design flaws caused by the shape of the flexible printed circuit board and the distance between components in the target apparatus before the actual fabrication of the target apparatus.

The simulation unit 12 determines the position and angles of each end point of a flexible printed circuit board so that they conform to the position and angles of a connector component disposed on a target apparatus (S12). The simulation unit 12 specifies the shape of the flexible printed circuit board on the basis of the positions and angles of both end points of the flexible printed circuit board (S13).

Each mass point of the flexible printed circuit board is under the force of gravity and a spring force. The simulation unit 12 specifies the shape of the flexible printed circuit board by calculating a state in which forces on the mass points are balanced using an equation of motion. When the target apparatus operates, the positions and orientations of connectors connected to both ends of the flexible printed circuit board are changed and the positions and orientations of the end points of the flexible printed circuit board are changed. In a flexible printed circuit board assembling simulation, the end points of the flexible printed circuit board in three-dimensional space may be moved by a mouse operation. As a result, the positions of mass points at the end points of the flexible printed circuit board are changed. The simulation unit 12 specifies the positions and angles of the end points of the flexible printed circuit board in the three-dimensional space at a certain point in time and specifies the shape of the flexible printed circuit board on the basis of the specified positions and angles of the end points of the flexible printed circuit board.

In the mass-spring method, when the flexible printed circuit board deforms in synchronization with the operation of the target apparatus, the simulation unit 12 specifies, for example, the position of each mass point of the flexible printed circuit board before the deformation and the position of each mass point of the flexible printed circuit board after the deformation. The simulation unit 12 sets the specified positions of the mass points as initial values and repeatedly performs a shape calculation using an equation of motion until the flexible printed circuit board is in a balanced state. In the balanced state, for example, the flexible printed circuit board has a stable shape with the both end points thereof fixed in space. The simulation unit 12 calculates the shape of the flexible printed circuit board by the above-described computation. In order to simulate the operation of the target apparatus, the simulation unit 12 periodically calculates the position of each component in the target apparatus using a three-dimensional model of the component. A sheet flexible object model such as a flexible printed circuit board at rest becomes stable in a state in which all springs are dynamically balanced with end points fixed. When the end points are moved, the mass points at the end points are forced to be displaced. After the displacement, the simulation unit 12 obtains a dynamically stable state by energy minimization calculation.

[2-3] Determination of Interference Between Sheet Flexible Object Model and Another Component Next, interference will be described. A flexible printed circuit board also deforms in synchronization with the operation of a target apparatus. Accordingly, the flexible printed circuit board may come into contact with another object. When a flexible printed circuit board comes into contact with another object, the flexible printed circuit board generally deforms to conform to the shape of the object.

The interference determination unit 13 determines whether the flexible printed circuit board interferes with another object in the target apparatus on the basis of a result of simulation performed by the simulation unit 12 (S14). The interference determination unit 13 determines whether there is interference between three-dimensional models by determining whether there is an intersection of a polygon on the surface of one of the three-dimensional models and a polygon on the surface of the other one of the three-dimensional models. A flexible printed circuit board according to this embodiment includes a plurality of polygons. Accordingly, the interference determination unit 13 determines whether there is interference between a polygon on the flexible printed circuit board and a polygon on another object. In addition, the interference determination unit 13 determines whether there is interference between polygons on the flexible printed circuit board.

When the interference determination unit 13 determines that there is no interference between the flexible printed circuit board and a component in the target apparatus (No in S14), the process returns to S12 in which the simulation unit 12 continuously performs computation to simulate the deformation of the flexible printed circuit board synchronized with movement of the connectors.

[2-4] Sheet Flexible Object Model Interference Processing

When the interference determination unit 13 determines that there is interference between the flexible printed circuit board and the component in the target apparatus (Yes in S14), the interference processing unit 14 changes detail meshes on the flexible printed circuit board to simple meshes (S15).

The size of each polygon affects the flexibility in the deformation of a sheet flexible object. When the size of each polygon is increased, the flexibility in the deformation of a sheet flexible object is limited. Accordingly, in the present embodiment, when there is interference between a sheet flexible object and another object, the size of each polygon on the sheet flexible object is increased. As a result, it is possible to prevent local deformation of the sheet flexible object at the time of interference with another object while representing natural deformation of the sheet flexible object. A mesh applied at the time of interference is defined as a simple mesh, and a polygon included in a simple mesh is defined as a simple polygon. A simple polygon is not limited to a rectangular polygon and may have any polygonal shape. In this embodiment, however, for simplification of description, a rectangular simple polygon is used.

Figure 12:
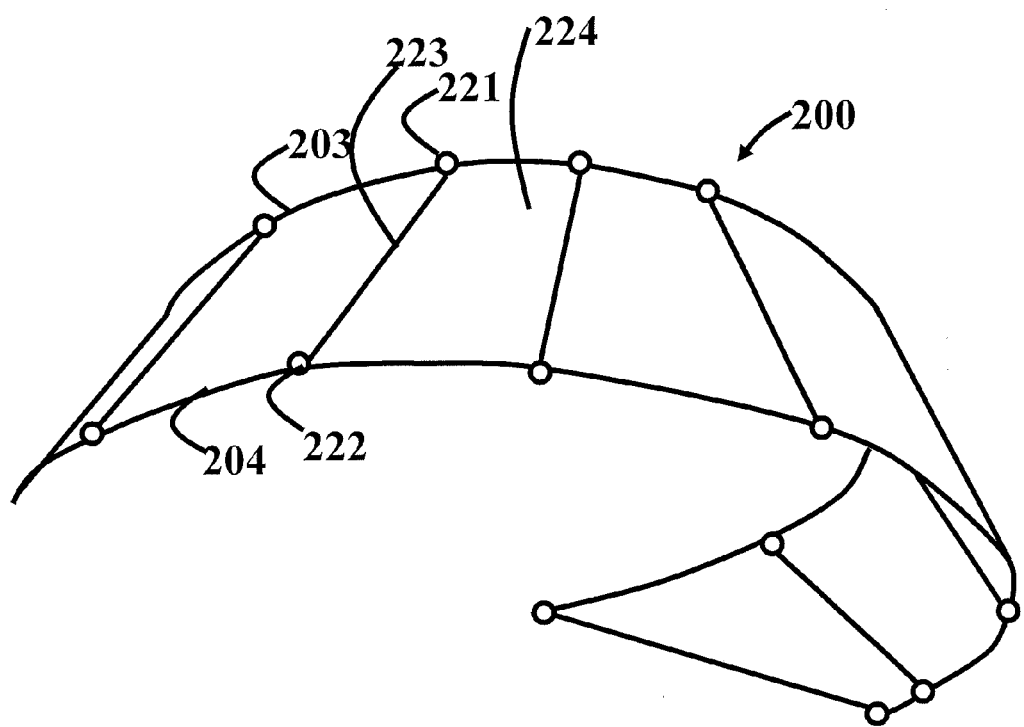
FIG. 12 is a diagram describing a developable surface.

The number of divisions of a flexible printed circuit board set to create simple meshes is larger than that set to create detail meshes. In this embodiment, when a sheet flexible object is divided into simple meshes, the characteristic of a developable surface is used. A curved surface generated from a plane like in a flexible printed circuit board is called a developable surface. FIG. 12 is a diagram describing a developable surface. As illustrated in FIG. 12, on a developable surface, straight lines 223 connecting curves on the sides 203 and 204 of the flexible printed circuit board 200 are present. By connecting both sides of the flexible printed circuit board 200 with the straight lines 223, the interference processing unit 14 can divide the surface of the flexible printed circuit board 200 into strip elements surrounded by the sides and the straight lines. An intersection 221 of the straight line 223 and the side 203, and an intersection 222 of the straight line 223 and the side 204 are illustrated. Each of the strip elements created by the interference processing unit 14 is defined as a simple polygon 224. The interference processing unit 14 divides a sheet flexible object along the longitudinal direction, thereby forming a group of second polygons.

In this embodiment, three examples of a method of determining a simple mesh at the time of interference will be described below.

[First Method]

Figure 13:
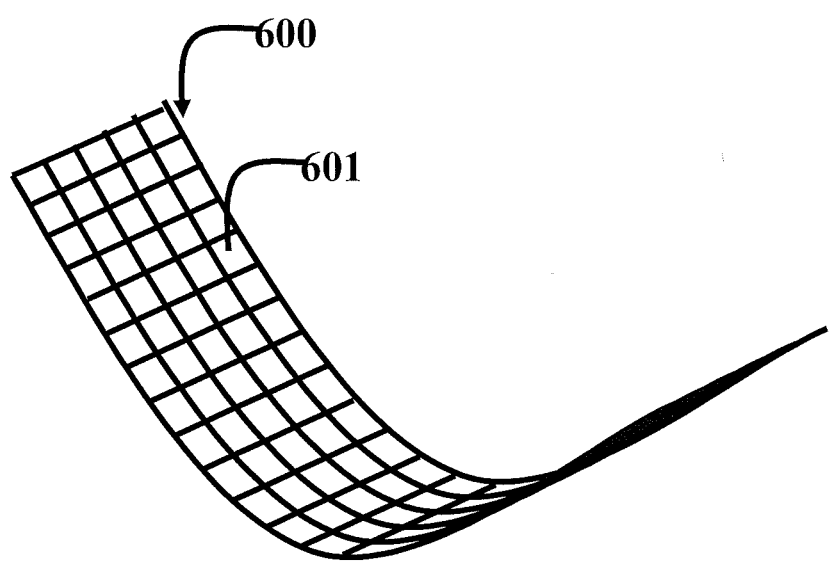
FIG. 13 is a diagram describing a first method of determining a simple polygon using a characteristic of a developable surface of a sheet flexible object.

FIGS. 13 to 16 are diagrams describing the first method of determining a simple polygon using the characteristic of a developable surface of a sheet flexible object. FIG. 13 illustrates a sheet flexible object model 600 that is an interference processing target. The sheet flexible object 600 includes a plurality of polygons. A polygon 601 is one of these polygons. The interference processing unit 14 calculates a developable surface from the curved surface of a sheet flexible object and generates strip simple polygons from the developable surface. In the following, a method of determining strip simple polygons will be described.

Figure 14:
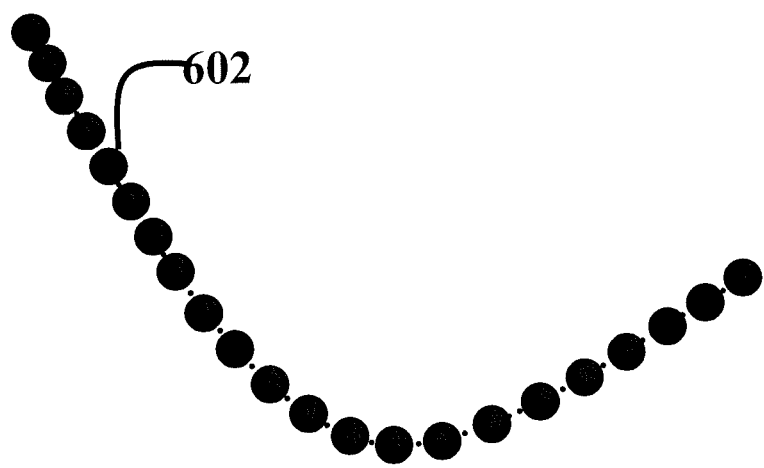
FIG. 14 is a diagram illustrating a group of mass points on one side of the sheet flexible object illustrated in FIG. 13.
Figure 15:
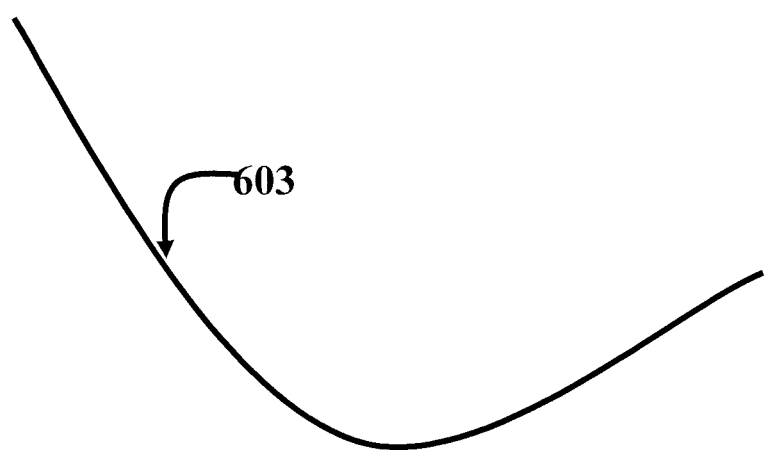
FIG. 15 is a diagram illustrating a Bezier curve.

FIG. 14 illustrates a group of mass points on one side of the sheet flexible object 600 illustrated in FIG. 13 and a line connecting the mass points. A mass point 602 is one of the mass points on one side of the sheet flexible object 600. The interference processing unit 14 fits the positions of mass points on one side of the sheet flexible object 600 to a Bézier curve and the positions of mass points on the other side of the sheet flexible object 600 to another Bézier curve. FIG. 15 illustrates a Bézier curve 603 to which the positions of mass points on one side of the sheet flexible object 600 are fitted. The interference processing unit 14 specifies points on Bézier curves on both sides at which the same tangential direction is obtained every predetermined angles and connects the specified points. The predetermined angles affect the size of a strip simple polygon. The mass points on each side are on a straight line when the sheet flexible object is developed in plan.

Figure 16:
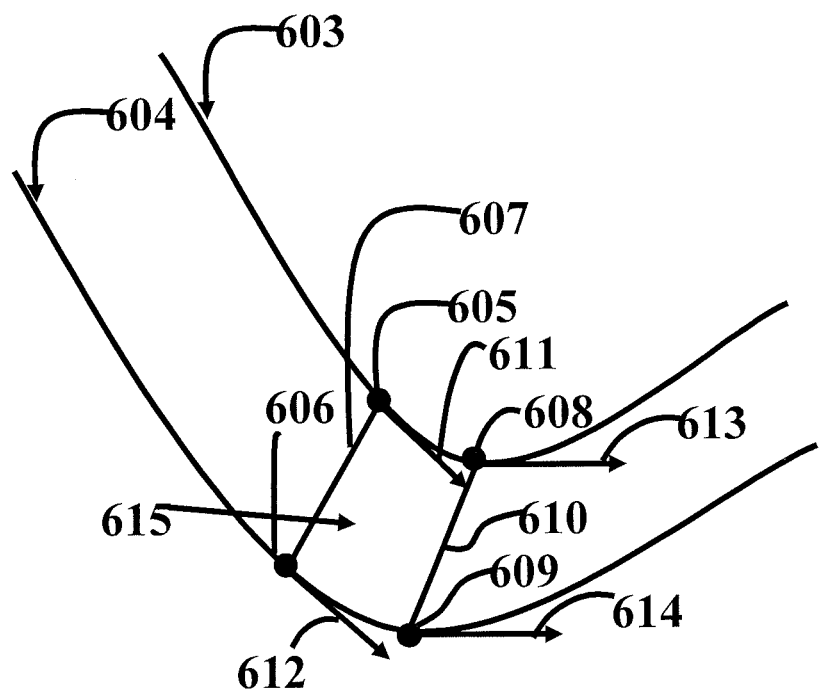
FIG. 16 is a diagram describing the first method of determining a simple polygon using a characteristic of a developable surface of a sheet flexible object.

FIG. 16 illustrates straight lines each connecting points on curves on both sides of a sheet flexible object at which the same tangential direction is obtained. A Bézier curve 604 to which the positions of mass points on the other side of the sheet flexible object 600 are fitted, a point 605 at which a direction tangential to the Bézier curve 603 forms predetermined angles, a vector 611 tangential to the Bézier curve 603 at the point 605, a point 606 at which a direction tangential to the Bézier curve 604 forms the predetermined angles, and a vector 612 tangential to the Bézier curve 604 at the point 606 are illustrated. The vectors 611 and 612 point in the same direction. Furthermore, a straight line 607 connecting the points 605 and 606 over the sheet flexible object, a point 608 at which a direction tangential to the Bézier curve 603 forms predetermined angles, a vector 613 tangential to the Bézier curve 603 at the point 608, a point 609 at which a direction tangential to the Bézier curve 604 forms the predetermined angles, and a vector 614 tangential to the Bézier curve 604 at the point 609 are illustrated. The vectors 613 and 614 point in the same direction. Still furthermore, a straight line 610 connecting the points 608 and 609 over the sheet flexible object and a single strip simple polygon 615 specified by the points 605, 606, 608, and 609 are illustrated.

[Second Method]

Figure 17:
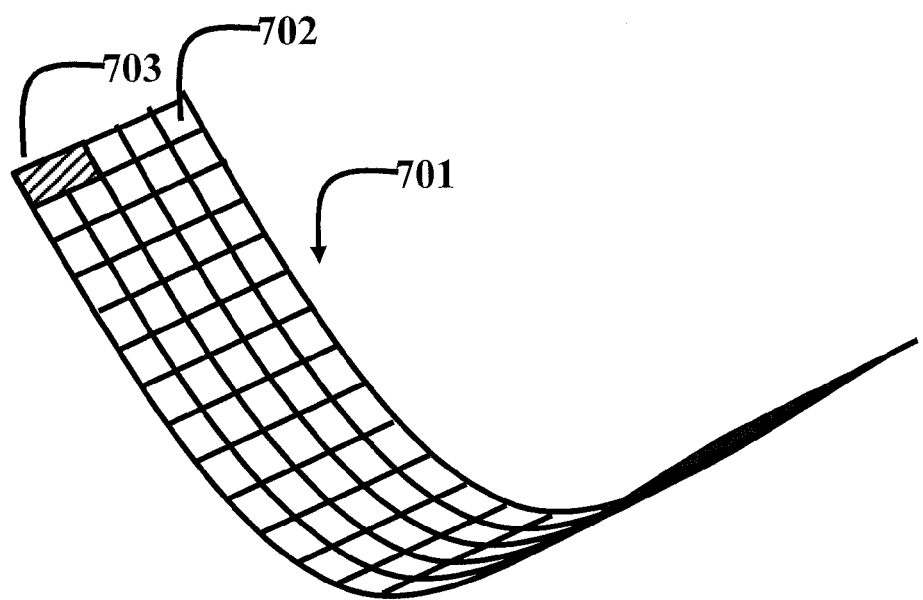
FIG. 17 is a diagram describing a second method of determining a simple polygon using a characteristic of a developable surface of a sheet flexible object.
Figure 18:
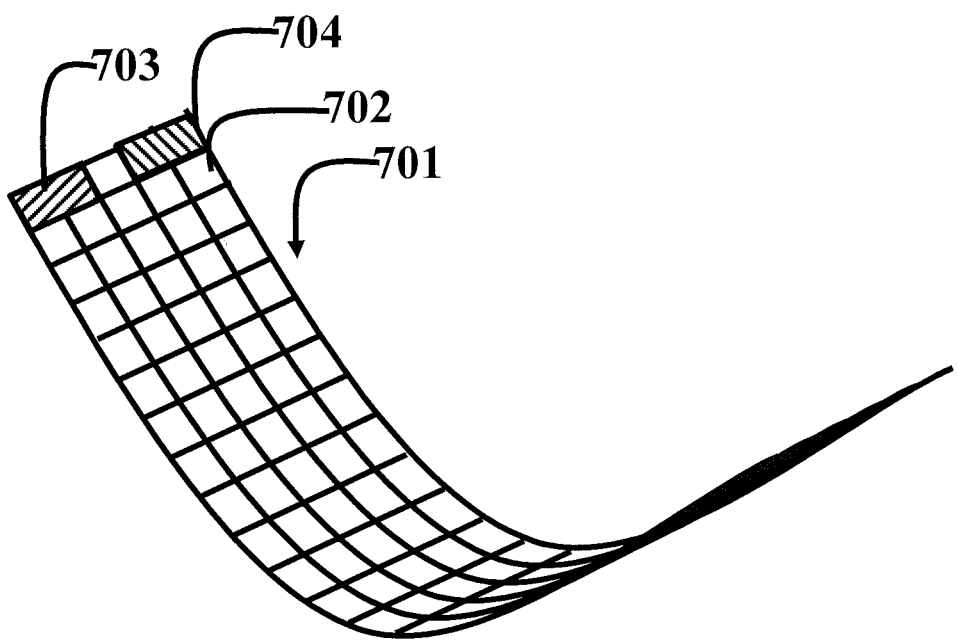
FIG. 18 is a diagram describing the second method of determining a simple polygon using a characteristic of a developable surface of a sheet flexible object.
Figure 19:
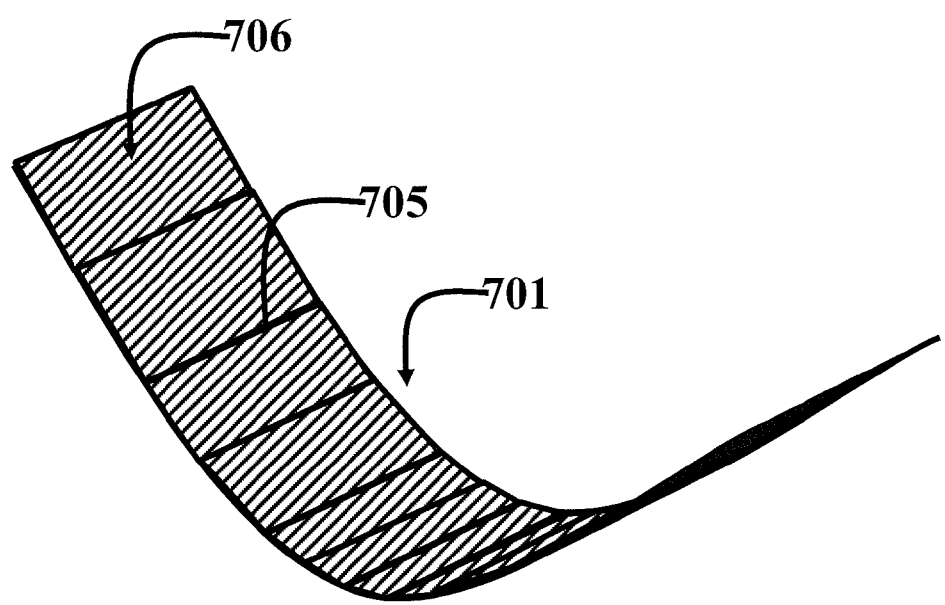
FIG. 19 is a diagram describing the second method of determining a simple polygon using a characteristic of a developable surface of a sheet flexible object.

FIGS. 17 to 19 are diagrams describing the second method of determining a simple polygon using the characteristic of a developable surface of a sheet flexible object. In the second method, a developable surface characteristic that adjacent polygons in the width direction of a sheet flexible object are on a straight line.

The interference processing unit 14 selects one of polygons on a sheet flexible object and selects, from among polygons adjacent to the selected polygon, a polygon with which the selected polygon achieves the best planar approximation when they are connected. For example, under the assumption that the position of a mass point is represented by Pi (i=1 to M and M represents the total number of mass points) and a plane is represented by ax+by+cz+d=0 (a normal vector to the plane is N=(a, b, c)), the interference processing unit 14 calculates a degree of planar approximation E using $E=\Sigma(N*Pi+d)^2$. Referring to FIG. 17, a sheet flexible object 701, a detail polygon 702 included in the sheet flexible object 701, and a polygon 703 obtained by connecting two detail polygons are illustrated.

The interference processing unit 14 detects, from among all sets of adjacent polygons, a set of adjacent polygons having the lowest degree of planar approximation E, and connects the polygons included in the detected polygon set to form a single polygon. A polygon 704 illustrated in FIG. 18 is a single polygon obtained by connecting the adjacent detail polygons illustrated in FIG. 17.

The interference processing unit 14 repeatedly performs this polygon connection processing until the number of polygons included in the flexible object is equal to or smaller than a predetermined number. When the number of polygons is equal to or smaller than the predetermined number, the interference processing unit 14 linearly fits the boundaries between polygons for smoothing. The interference processing unit 14 determines a strip simple polygon by performing the above-described processing. A line 705 illustrated in FIG. 19 is a smooth line obtained by fitting the boundaries between polygons after the polygon connection processing. A simple polygon 706 illustrated in FIG. 19 is one of simple polygons surrounded by the lines 705 and both sides of the sheet flexible object 701.

[Third Method]

Next, the third method will be described. When it can be assumed that a sheet flexible object deforms around a single rotation axis, the interference processing unit 14 determines a simple polygon by performing the following processing. The interference processing unit 14 specifies a normal direction for each detail polygon, calculates a direction perpendicular to all of the specified normal directions using the least square method, determines a straight line that is parallel to the calculated direction and connects both sides of the sheet flexible object, and sets the determined straight line as a boundary between simple polygons on the sheet flexible object.

Figure 20:
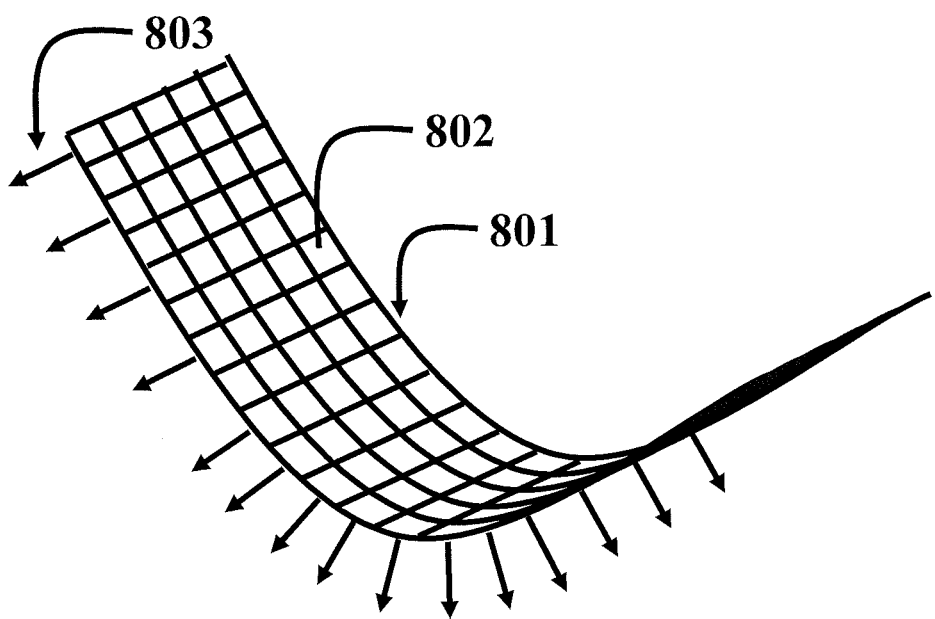
FIG. 20 is a diagram describing a third method of determining a simple polygon.
Figure 21:
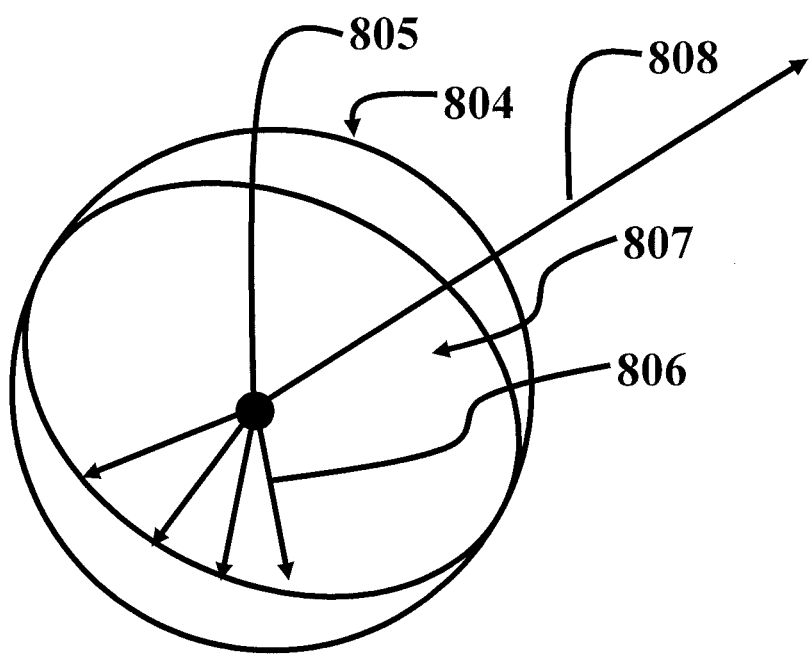
FIG. 21 is a diagram describing the third method of determining a simple polygon.

FIGS. 20 and 21 are diagrams describing the third method of determining a simple polygon. Referring to FIG. 20, a sheet flexible object 801, a detail polygon 802 that is one of detail polygons, and arrows 803 representing normal directions to the detail polygons are illustrated.

Referring to FIG. 21, a unit ball 804 (Gaussian sphere) and a center 805 of the unit ball 804 are illustrated. A starting point of a normal vector of each detail polygon on the sheet flexible object 801 is set as the center of a unit ball. Furthermore, a normal vector 806 that is one of normal vectors of detail polygons on the sheet flexible object 801 extending from the center 805 of the unit ball 804, a plane 807 on which the normal vectors are present, and a normal vector 808 of the plane 807 are illustrated. The interference processing unit 14 determines straight lines that connect both sides of the sheet flexible object and are parallel to the normal vector 808 at predetermined spacings and sets the determined straight lines as boundaries between simple polygons.

Using one of the above-described methods, the interference processing unit 14 determines a simple polygon.

[Relationship Between Detail Polygon and Simple Polygon]

The interference processing unit 14 stores the relationship between a detail polygon and a simple polygon in the memory

20 after determining simple polygons on a flexible printed circuit board. More specifically, the interference processing unit 14 detects vertex information of detail polygons included in a simple polygon region, associates the detected detail polygon vertex information with the simple polygon, and stores them in the memory 20.

A detail mesh has the following data structure.
is vertex identification information, i=1 to N
N: the number of vertices
Pi: the three-dimensional position of a vertex i, Pi=(xi, yi, zi)
A simple mesh has the following data structure.
j: polygon identification information, j=1 to M
M: the number of polygons
Cj: the local coordinate system of a polygon j
Qjk: the position of a vertex k of a detail polygon included in a simple polygon (a three-dimensional position in the local coordinate system Cj)

Figure 22:
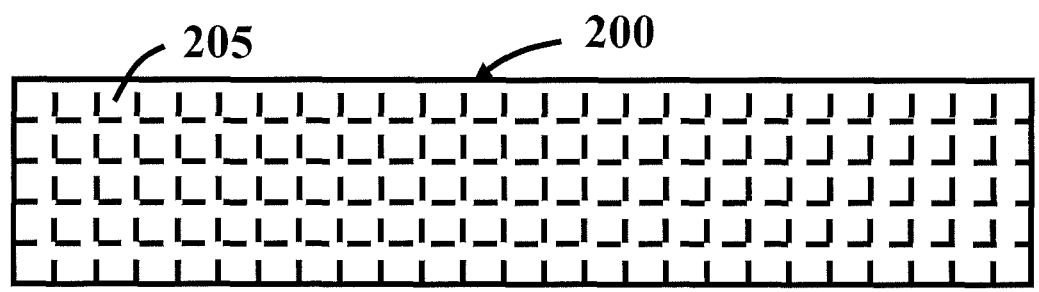
FIG. 22 is a diagram describing the relationship between a detail polygon and a simple polygon.
Figure 23:
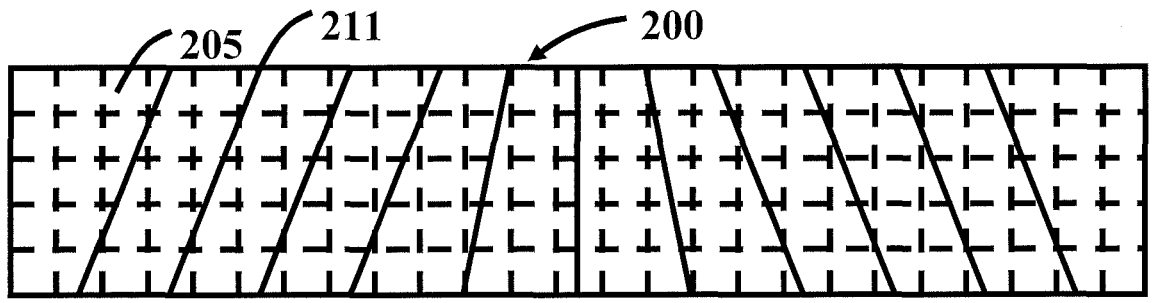
FIG. 23 is a diagram describing the relationship between a detail polygon and a simple polygon.
Figure 24:
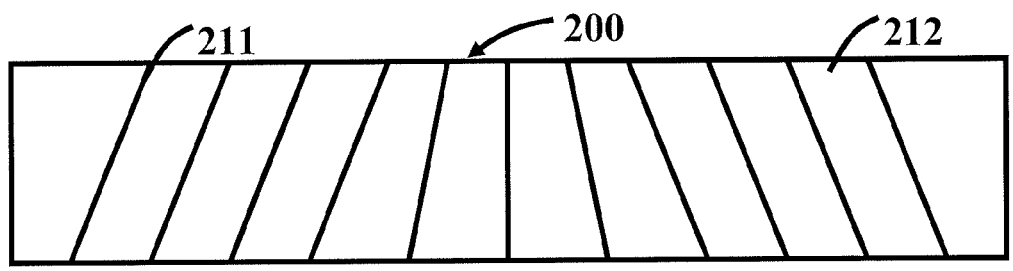
FIG. 24 is a diagram describing the relationship between a detail polygon and a simple polygon.

FIGS. 22 to 25 are diagrams describing the relationship between a detail polygon and a simple polygon. Referring to FIG. 22, a flexible printed circuit board 200 and detail polygons 201 each surrounded by broken lines or by broken lines and sides of a sheet flexible object are illustrated. Referring to FIG. 23, in addition to the flexible printed circuit board 200 and the detail polygons 201 illustrated in FIG. 22, straight lines 202 that connect both sides of the flexible printed circuit board 200 and are used to determine simple meshes are illustrated. Referring to FIG. 24, in addition to the flexible printed circuit board 200 and the straight lines 202 illustrated in FIG. 23, a simple polygon 203 that is one of simple polygons on the flexible printed circuit board 200 is illustrated.

Figure 25:
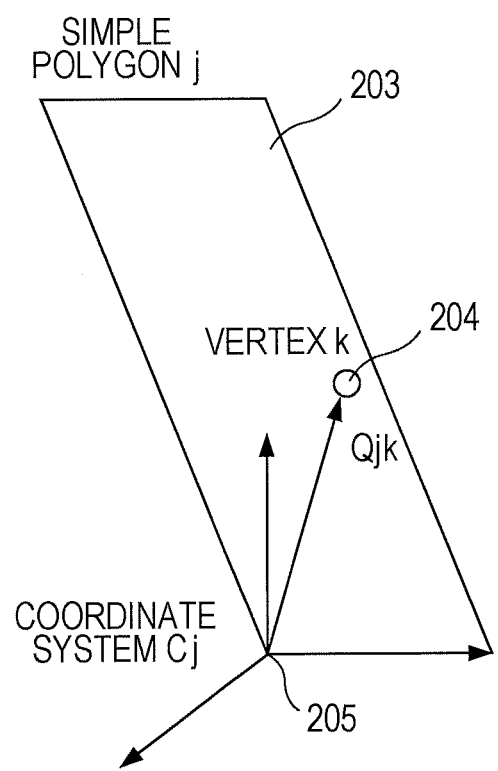
FIG. 25 is a diagram describing the relationship between a detail polygon and a simple polygon.

Referring to FIG. 25, the simple polygon 203 illustrated in FIG. 24 includes vertices of a plurality of detail polygons including the vertex 204 (k). A local coordinate system 205 of the simple polygon 203 is represented by Cj where j represents an identification number of the simple polygon 203. The position of the vertex 204 (k) in the local coordinate system 205 (Cj) is determined by Qjk.

FIG. 26 illustrates a data table 260 for a simple mesh in the flexible printed circuit board 200. The simple mesh data table 260 includes identification information (a simple polygon ID) identifying a simple polygon in a simple mesh, information about the local coordinate system of the simple polygon, information about the vertex of each detail polygon included in the simple polygon, and information about the position of the vertex of each detail polygon in the local coordinate system.

[2-5] Calculation of Profiling Shape of Sheet Flexible Object Model

Next, the profiling shape computation unit 15 calculates the profiling shape of the sheet flexible object (S16). In this embodiment, profiling deformation represents that a sheet flexible object interfering with another object deforms along the surface of the object. The profiling shape computation unit 15 specifies the profiling deformation of the sheet flexible object using the simple polygons determined by the interference processing unit 14.

Figure 27:
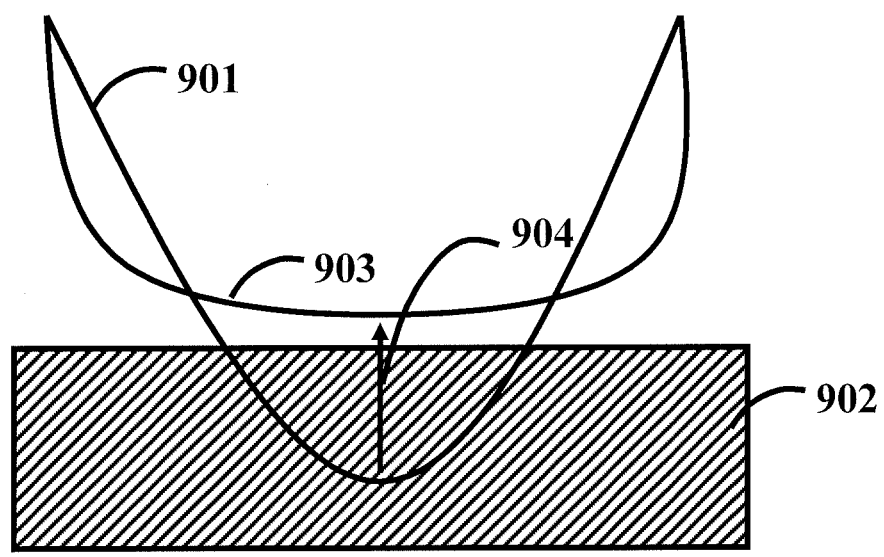
FIG. 27 is a diagram describing the profiling shape of a flexible object.

FIG. 27 is a diagram describing the profiling shape of a sheet flexible object 901. In FIG. 27, only one side of the sheet flexible object 901 is illustrated. When the sheet flexible object 901 interferes with another object 902, the sheet flexible object 901 cannot be in the interior of the object 902. Accordingly, the profiling shape computation unit 15 moves a part of the sheet flexible object 901 in the object 902 to the outside of the object 902. An arrow 904 represents the movement of a part of the sheet flexible object 901 interfering with the object 902 to the surface of the object 902. The profiling shape computation unit 15 deforms the sheet flexible object 901 so that the sheet flexible object 901 conforms to the surface of the object 902. After profiling deformation performed by the profiling shape computation unit 15, the shape of the sheet flexible object 901 is changed to a shape 903.

Figure 28:
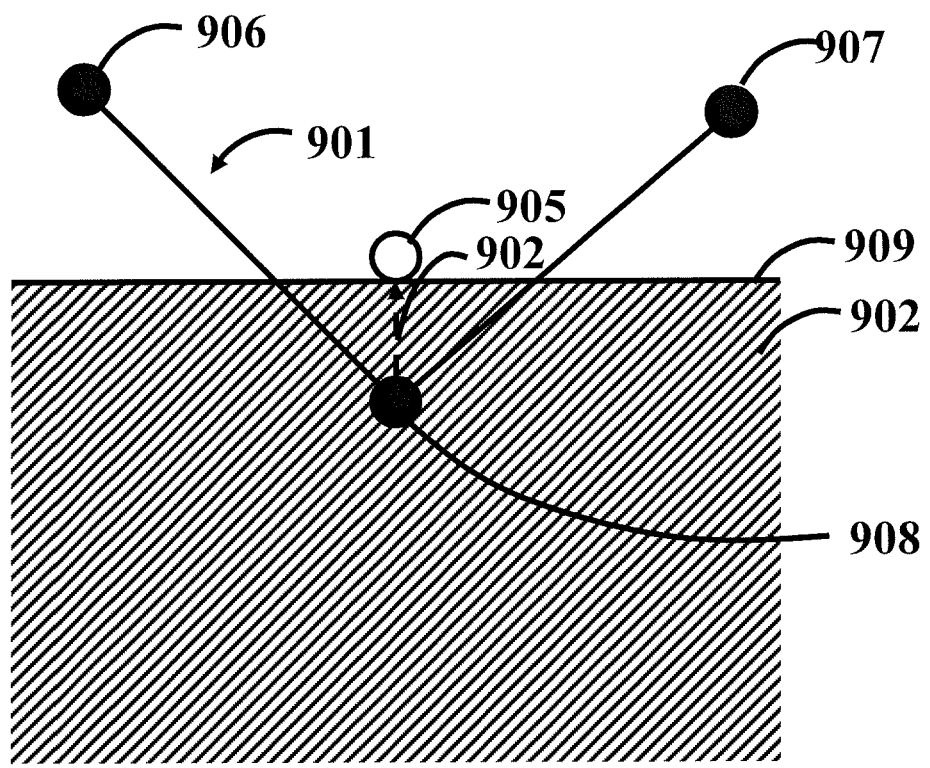
FIG. 28 is a diagram describing the computation of a profiling shape using mass points of a sheet flexible object.

FIG. 28 is a diagram describing the computation of a profiling shape using mass points of a sheet flexible object. In FIG. 28, only one side of a sheet flexible object is illustrated.

Referring to FIG. 28, mass points 908, 906, and 907 of the sheet flexible object 901 and a surface 909 of the object 902 are illustrated. The mass point 908 is in the object 902 and interferes with the object 902. The mass point 908 is subjected to profiling deformation and is moved to a position 905. The mass points 906 and 907 are adjacent to the mass point 908.

The profiling shape computation unit 15 performs profiling deformation processing so as to move the mass point 908 to the position 905. The mass points 906 and 907 also move in synchronization with the movement of the mass point 908. For example, when the mass point 908 moves to the position 905, the profiling shape computation unit 15 moves the mass point 906 while keeping a fixed distance between the mass points 906 and 908. At that time, when there is a mass point adjacent to the mass point 906, the profiling shape computation unit 15 moves the mass point while keeping a fixed distance between the mass point and the mass point 906. At the time of movement of each mass point, the profiling shape computation unit 15 determines an angle between polygons formed by mass points in consideration of a spring constant of a spring between these polygons.

Figure 29:
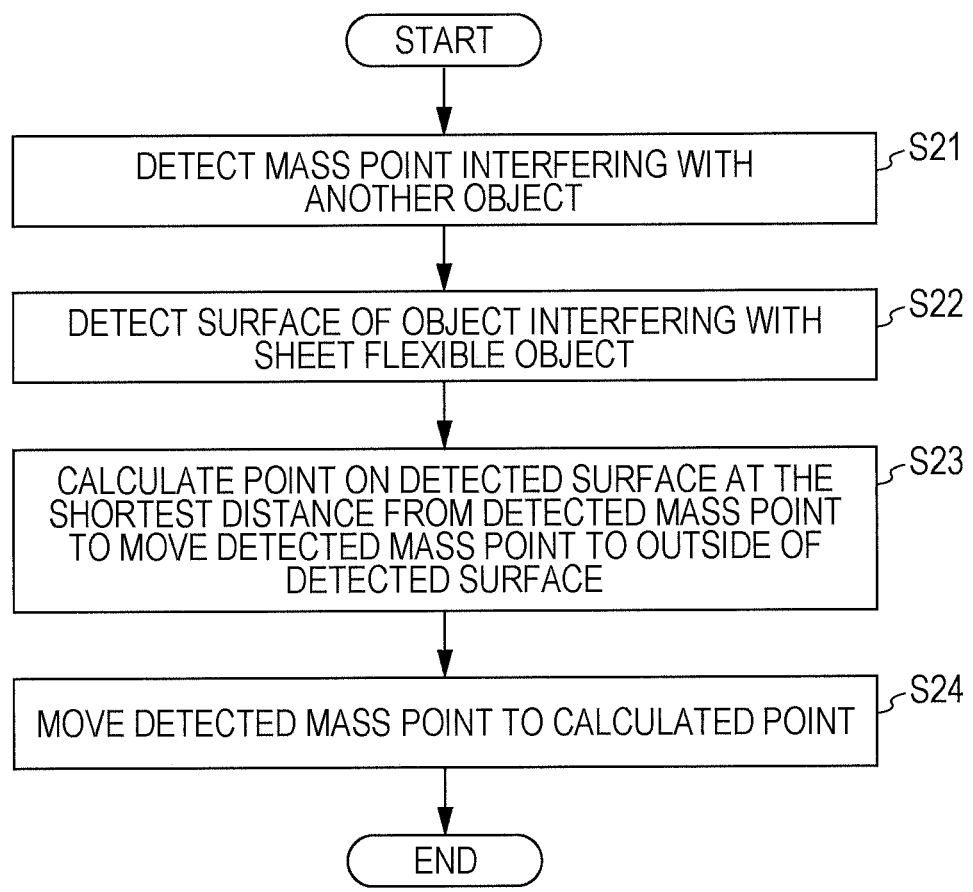
FIG. 29 is a flowchart illustrating a profiling deformation process.

FIG. 29 is a flowchart illustrating a profiling deformation process. When the profiling shape computation unit 15 calculates the shape of a sheet flexible object that has been subjected to profiling deformation, the profiling shape computation unit 15 moves a mass point of the sheet flexible object interfering with another object to a position where no interference occurs. The profiling shape computation unit 15 detects a mass point of the sheet flexible object that has been determined to interfere with another object by the interference determination unit 13 (S21). The profiling shape computation unit 15 detects the surface of the object that has been determined to interfere with the sheet flexible object by the interference determination unit 13 (S22). The profiling shape computation unit 15 calculates, for each mass point of the sheet flexible object interfering with the object, a point that is on the surface of the object and is at the shortest distance from the mass point (S23). The profiling shape computation unit 15 moves the mass point of the sheet flexible object to a position at a short distance away from the calculated point in a direction outside the surface of the object (S24). The profiling shape computation unit 15 changes the position of another mass point while keeping a fixed distance to the moved mass point.

[2-6] Flexible Object Model Interference Processing

The interference processing unit 14 changes each simple mesh of the sheet flexible object whose profiling shape has been determined by the profiling shape computation unit 15 to detail meshes (S17). The interference processing unit 14 stores vertex information of original polygons included in each simple polygon in the data table 260 in the memory 20 at the time of generation of the simple polygon. The interference processing unit 14 sets the mass points of the detail polygons in consideration of the position of the simple polygon. As a result, a three-dimensional simulation apparatus can change each polygon of a sheet flexible object from a simple polygon to detail polygons and simulate the detailed operation of the sheet flexible object by computation.

[2-7] Output of Simulation Computation Result

The output unit 16 outputs the positions of a target apparatus and each component included in the target apparatus and the position and shape of a flexible printed circuit board in the form of information displayable on the display 31.

Using the above-described three-dimensional model simulation method, sufficiently fine detail meshes are usually used in a sheet flexible object so as to represent free deformation of the sheet flexible object, and are converted into relatively coarse simple meshes so as to reduce the flexibility in deformation at the time of interference with another object. As a result, it is possible to prevent local deformation of the sheet flexible object at the time of interference between the sheet flexible object and another object while representing natural deformation of the sheet flexible object. In addition, since the amount of calculation for profiling deformation of the sheet flexible object at the time of the interference is reduced, it is possible to rapidly calculate a profiling deformation shape and allow a user to quickly check the profiling deformation shape. When meshes in the sheet flexible object are converted into simple meshes, the characteristic of a developable surface is used. On a developable surface, a straight line connecting two curves on both sides of the developable surface is present. Accordingly, meshes in the sheet flexible object can be divided into strip simple meshes.

The present invention can be applied to a three-dimensional CAD simulation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable medium storing a three-dimensional simulation program that is executed by a three-dimensional simulation apparatus including a memory that stores form information of a sheet flexible object model formed of first polygons and another object model, the three-dimensional simulation program causing the three-dimensional simulation apparatus to:

determine whether the sheet flexible object model formed of the first polygons in three-dimensional simulation space interferes with the other object model on the basis of the form information stored in the memory;

form second polygons by dividing the sheet flexible object model in a longitudinal direction when determining that the sheet flexible object model interferes with the other object model; and determine a shape of the sheet flexible object model using the formed second polygons in consideration of a shape of the other object model.

2. The non-transitory computer-readable medium according to claim 1, the computer further causing the three-dimensional simulation apparatus to, after determining the shape of the sheet flexible object model interfering with the other object model using the formed second polygons, specify a positional relationship between the second polygons in the sheet flexible object model whose shape has been determined and the first polygons in the sheet flexible object model.

3. The non-transitory computer-readable medium according to claim 1, the computer further causing the three-dimensional simulation apparatus to:

specify a shape of the sheet flexible object model that deforms in accordance with changes in positions and directions of both ends of the sheet flexible object model in the longitudinal direction; and determine whether the sheet flexible object model having the specified shape comes into contact with the other object model.

4. The non-transitory computer-readable medium according to claim 1, wherein the second polygons are formed by connecting corresponding ones of the first polygons to allow the sheet flexible object model to deform along a surface of the other object model.

5. The non-transitory computer-readable medium according to claim 1, wherein Bézier curves at both ends of the sheet flexible object model along the longitudinal direction are specified, points on the Bézier curves at which the same tangential direction is obtained are specified every predetermined angles, and a region surrounded by lines each connecting the specified points and the ends of the sheet flexible object model along the longitudinal direction and the Bézier curves is set as one of the second polygons.

6. The non-transitory computer-readable medium according to claim 1, wherein normal vectors to surfaces of the first polygons in the sheet flexible object model are specified, starting points of the specified normal vectors are set as an origin of three-dimensional space coordinates, and, when the normal vectors are present on the same coordinate plane of the three-dimensional space coordinates, the sheet flexible object model is divided into the second polygons using straight lines parallel to a normal direction with respect to the coordinate plane.

7. A three-dimensional simulation method comprising:

determining whether a sheet flexible object model formed of first polygons in three-dimensional simulation space interferes with another object model;

forming second polygons by dividing the sheet flexible object model in a longitudinal direction when determining that the sheet flexible object model interferes with the other object model; and determining a shape of the sheet flexible object model using the formed second polygons in consideration of a shape of the other object model, by a computer.

8. A three-dimensional simulation apparatus comprising:

a memory configured to store form information of a sheet flexible object model formed of first polygons and another object model;

a processor configured to execute to:

determining whether the sheet flexible object model formed of the first polygons in three-dimensional simulation space interferes with the other object model on the basis of the form information stored in the memory;

forming second polygons by dividing the sheet flexible object model in a longitudinal direction when it is determined that the sheet flexible object model interferes with the other object model; and determining a shape of the sheet flexible object model using the formed second polygons in consideration of a shape of the other object model.

* * * * *